March 25, 1958     J. R. FURPHY     2,827,936
EGG CRACKER
Filed Nov. 26, 1954

INVENTOR.
JOSEPH R. FURPHY
BY
ATTORNEY

United States Patent Office 2,827,936
Patented Mar. 25, 1958

2,827,936
EGG CRACKER
Joseph R. Furphy, Salida, Colo.
Application November 26, 1954, Serial No. 471,387
1 Claim. (Cl. 146—2)

The present invention relates to an apparatus useful during the preparation of various egg dishes, and, more particularly, to "an egg cracker."

Previously, various devices have been designed to facilitate the cracking of eggs, and additional devices have been made for separating the yolk and albumen of eggs in order to facilitate the preparation of various egg-containing foods.

It is an object of the present invention to provide an improvement in the art of egg-cracking or egg-breaking and separating devices in which all necessary elements needed to make the complete device are provided unitarily in a single bowl structure.

It is a further object of the present invention to provide a bowl having an egg-cracking compartment adjacent an egg-separating device, so that eggs may be readily broken and separated.

A further object of the present invention is to provide an improved structure for an egg-breaking device that will permit accurate gauging of the depth of cut made in the egg when the egg shell is being broken.

Another object of the present invention is to provide an improved egg separator designed to retain the egg yolk while allowing free drainage of the albumen into the supporting bowl structure in which a pouring lip is provided for easy removal of the yolks.

Further objects and advantages of the present invention will be apparent in the appended description and drawings, in which—

Figure 1:
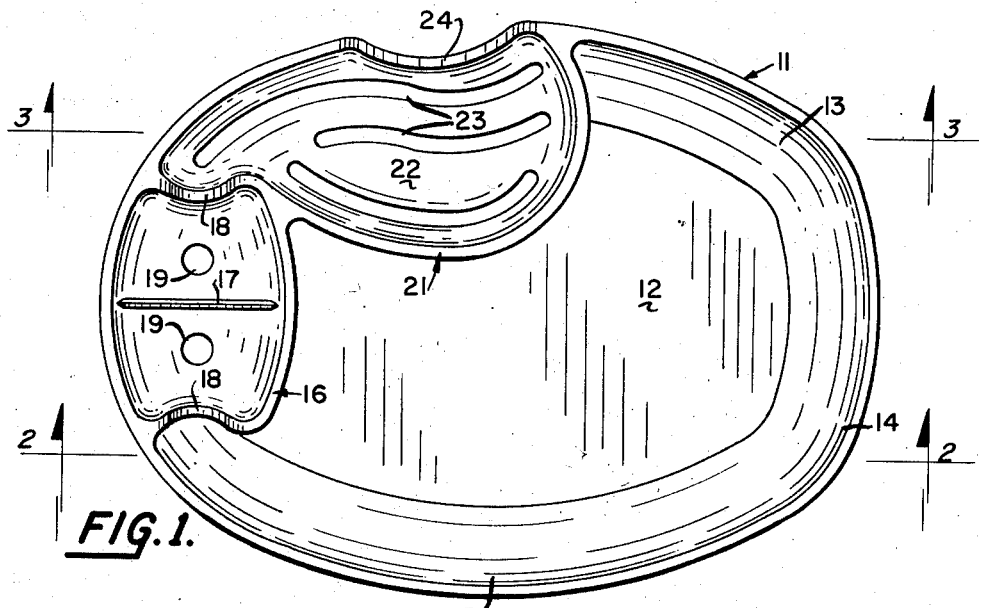
Figure 2:
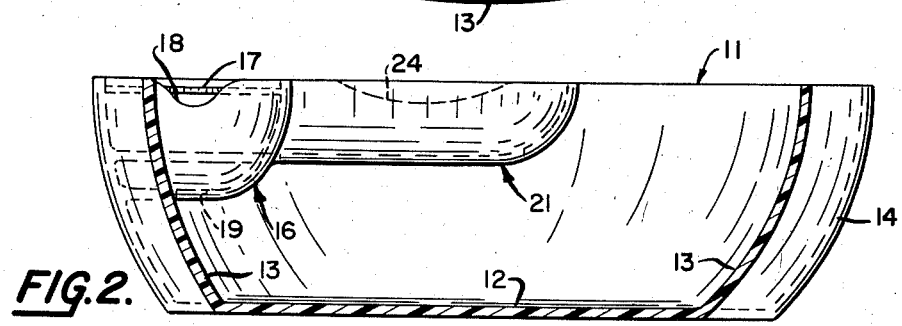
Figure 3:
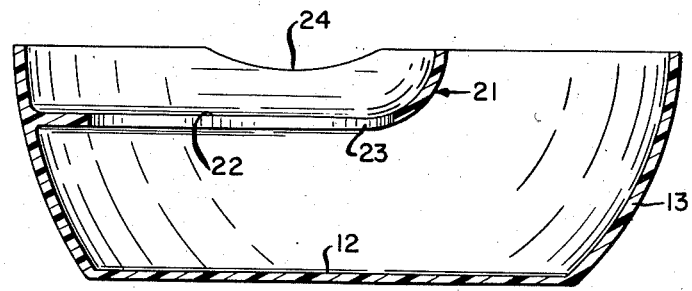

Fig. 1 is a top plan view showing the overall structure of the present invention, Fig. 2 is a side elevation taken along the line 2—2 of Fig. 1, and Fig. 3 is a side elevation taken along the line 3—3 of Fig. 1.

Briefly stated, the present invention provides a unitary structure of substantially bowl shape which supports an internally positioned egg-breaking device and a separate egg-separating device mounted on the bowl rim in position above the bottom of the bowl. The egg-breaking device provides a sharp edge blade and finger engaging depressions adjacent thereto for accurate cracking of the egg shell. The egg-separating device, which is adjacent to the egg-breaking device, provides a plurality of elongated openings in the bottom through which the albumen of the egg may be readily drained while the yolk is retained in the separator to be poured out of the bowl structure over a depressed lip.

Referring now to the drawings, the detailed features of the present invention will be more readily seen and understood. In the embodiment shown, the bowl 11 is provided with a flat supporting bottom 12 and inclined side walls 13 which at one end of the bowl provide a pouring lip 14 over which the contents received in the bottom of the bowl may be poured. At the opposite end of the bowl an egg-cracking device 16 is supported on the side walls 13 and positioned above the bottom 12. The egg cracking device 16, which is of hollow hemi-ellipsodial shape substantially corresponding to the shape of an egg provides support for an upright cutting blade 17 formed of the same material as the bowl or of a metal insert and disposed transversely with respect to the major axis of the egg separating device 16. At the ends of the separating device 16 depressions 18 are formed in the ellipsoid, so that the blade 17 extends above the lowermost point in the depression. It is intended that during use the ends of the egg to be broken will be gripped between the thumb and fingers of the operator. The thumb and fingers will then be directed downwardly in a striking motion toward the depressions 18. With proper positioning of the fingers the egg will be cracked by the blade 17 with only the desired amount of penetration of the egg shell by the blade 17. With this arrangement rupture of the egg yoke may be avoided, and accordingly the eggs when removed from the shell may be separated or used whole. Since some albumen may escape during the breaking, openings 19 are provided in the bottom of the egg breaking device 16.

In position adjacent to the egg breaking device 16 an egg separator 21 is provided. As shown in Figs. 2 and 3, the separator 21 is a relatively shallow structure likewise supported above the bottom 12 of the bowl 11. The bottom 22 of the separator 21 is provided with a plurality of elongated openings 23 of relatively narrow width through which the albumen of the egg may freely flow while the yolk of the egg is retained on the bottom 22. It should be noted that the side walls 13 of the bowl 11 are relieved adjacent the separator 21 to provide a depressed pouring lip 24 which will facilitate removal of the egg yolks after the albumen has been drained. The use of the depressed lip 24 makes it possible to pour the egg yolks out of the separator without tilting the bowl 11 enough to cause spillage of the contents retained on the bottom 12 of the bowl. In fact, with this arrangement only a slight tipping of the bowl is necessary to remove the egg yolks.

The present invention has many uses, all of which are complemented by the structure as shown. Many cooks prefer to crack their eggs and dump them into a receptacle for observation before pouring them into a frying pan or the like. This device provides a place to break the egg, a place of observation on the bottom 12 and a convenient pouring lip 14. Again, if desired, sufficient capacity is provided by the bowl 11, so that eggs may be mixed or scrambled before they are poured therefrom. When eggs are to be separated, the entire egg will be dumped in the egg separator 21 with the albumen being received in the bowl while the yolks may be dispensed over the depression 24 into a separate container.

While one separate embodiment of the invention has been shown and described, it will be apparent that the present invention is adaptable to various modifications and changes. All such modifications and changes as are within the scope of the hereunto appended claim are deemed to be a part of this invention.

What is claimed is:

A hand-operated egg cracking device comprising a support structure of hemi-ellipsoidal shape having raised side walls positioned apart along the major axis a distance corresponding to the major length of an egg, a cutting blade positioned intermediate said side walls and disposed transversely to said major axis, said side walls being relieved to provide aligned depressions on opposite sides of said blade reducing the elevation of said side walls in the depressions below the elevation of said blade whereby a cut of predetermined depth may be made when an egg is held between supporting fingers and a striking blow of the fingers and egg respectively is directed into said depressions and against said cutting blade.

References Cited in the file of this patent
UNITED STATES PATENTS

| | | |
|---|---|---|
| 1,262,420 | Wicke | Apr. 9, 1918 |
| 1,409,649 | Becker | Mar. 1, 1922 |
| 2,463,168 | Goebel | Mar. 1, 1949 |
| 2,612,921 | Tomola | Oct. 7, 1952 |
| 2,706,507 | Bartell | Apr. 19, 1955 |